United States Patent
Xu et al.

(10) Patent No.: US 12,271,523 B2
(45) Date of Patent: Apr. 8, 2025

(54) LIGHTWEIGHT HAND EXOSKELETON FORCE FEEDBACK APPARATUS

(71) Applicant: SOUTHEAST UNIVERSITY, Suzhou (CN)

(72) Inventors: Baoguo Xu, Suzhou (CN); Qianqian Lu, Suzhou (CN); Weifeng Peng, Suzhou (CN); Aiguo Song, Suzhou (CN)

(73) Assignee: SOUTHEAST UNIVERSITY, Jiangsu (CN)

( * ) Notice: Subject to any disclaimer, the term of this patent is extended or adjusted under 35 U.S.C. 154(b) by 0 days.

(21) Appl. No.: 18/634,995

(22) Filed: Apr. 14, 2024

(65) Prior Publication Data
US 2025/0076981 A1 Mar. 6, 2025

Related U.S. Application Data

(63) Continuation of application No. PCT/CN2023/127214, filed on Oct. 27, 2023.

(30) Foreign Application Priority Data

Aug. 28, 2023 (CN) .......................... 202311088293.9

(51) Int. Cl.
*G06F 3/01* (2006.01)

(52) U.S. Cl.
CPC .............. *G06F 3/014* (2013.01); *G06F 3/016* (2013.01)

(58) Field of Classification Search
CPC ....... G06F 3/014; G06F 3/016; A61H 1/0285; A61H 1/0288; A61H 2201/165;

(Continued)

(56) References Cited

U.S. PATENT DOCUMENTS

2016/0259417 A1  9/2016 Gu
2021/0059888 A1* 3/2021 Luijten ................. B25J 9/0006

FOREIGN PATENT DOCUMENTS

CN  108670412   10/2018
CN  109893400    6/2019

(Continued)

OTHER PUBLICATIONS

"International Search Report (Form PCT/ISA/210) of PCT/CN2023/127214," mailed on Dec. 5, 2023, pp. 1-3.

(Continued)

*Primary Examiner* — Priyank J Shah
(74) *Attorney, Agent, or Firm* — JCIPRNET

(57) ABSTRACT

Disclosed is a lightweight hand exoskeleton force feedback apparatus, including a driver, a first rotating link, a second rotating link, a first linkage link, a second linkage link, a finger sleeve, and a pressure sensor fixing member; the driver is worn on a back of metacarpal bone of a human hand, the finger sleeve is fixed on an index finger, and the pressure sensor fixing member is fixed below the index finger; when the human hand bends to simulate a state of grasping an object, the driver drives the first rotating link to couple with the first linkage link and the second linkage link through the second rotating link to drive the finger sleeve to bend and stretch, force feedback is applied to the fingertip, and a pressure is accordingly imposed on a pressure sensor of the pressure sensor fixing member, so that closed-loop force feedback control is implemented.

8 Claims, 5 Drawing Sheets

(58) Field of Classification Search
CPC ...... A61H 2201/5071; A61H 2205/067; A63B 21/00181; A63B 21/4019; A63B 23/16; B25J 9/0006; B25J 13/02
See application file for complete search history.

(56) References Cited

FOREIGN PATENT DOCUMENTS

| | | |
|---|---|---|
| CN | 110251898 | 9/2019 |
| CN | 217213651 | 8/2022 |

OTHER PUBLICATIONS

"Written Opinion of the International Searching Authority (Form PCT/ISA/237) of PCT/CN2023/127214," mailed on Dec. 5, 2023, pp. 1-4.

* cited by examiner

LIGHTWEIGHT HAND EXOSKELETON FORCE FEEDBACK APPARATUS

CROSS-REFERENCE TO RELATED APPLICATION

This application is a continuation of international application of PCT application serial no. PCT/CN2023/127214 filed on Oct. 27, 2023, which claims the priority benefit of China application no. 202311088293.9, filed on Aug. 28, 2023. The entirety of each of the above mentioned patent applications is hereby incorporated by reference herein and made a part of this specification.

BACKGROUND

Technical Field

The present disclosure belongs to the technical field of exoskeleton robots, and particularly relates to a lightweight hand exoskeleton force feedback apparatus.

Description of Related Art

The trend of population aging is intensifying around the world, the self-care ability of the elderly becomes weakened, which is manifested as functional impairment or loss, including difficulties in daily life activities or inability to perform basic self-care activities, such as eating, grooming, dressing, toileting, and walking. A force feedback exoskeleton is expected to be a solution to challenges posed by an aging society, and can help the elderly maintain their abilities of physical activity, delay muscle strength decline, and improve self-care ability. In addition, when being combined with technologies such as virtual reality (VR) and augmented reality (AR), a force feedback exoskeleton device can provide a more immersive somatosensory interaction experience, a wearer can interact with a virtual environment through the exoskeleton, thereby enhancing the entertainment experience and the training effect.

Traditional finger force feedback exoskeleton devices have certain limitations, and may cause discomfort due to their complex structures and excessive weight, making the patients feel inconvenient when wearing and using them, and easily causing harm to wearers. Therefore, they cannot be worn for a long period of time. Moreover, they are often open-loop controlled, lacking closed-loop control over a driver's output. Furthermore, the traditional finger force feedback exoskeleton devices have fixed axes of rotation, while human index finger bones rotate in multiple axes, with force directions changed. Most traditional exoskeleton designs cannot adapt to the axes of rotation.

SUMMARY

In order to solve the above problems, the present disclosure provides a lightweight hand exoskeleton force feedback apparatus, which is simple in structure and has a pressure sensor, thereby realizing closed-loop control of index finger force feedback.

In order to achieve the above objective, the present disclosure adopts the following technical solution:

a lightweight hand exoskeleton force feedback apparatus, including a driver, a driver power fixing member, a driver fixing rotating shaft fixing member, a driver pull rod fixing member, a first rotating link, a second rotating link, a first linkage link, a second linkage link, bearings, gaskets, a finger sleeve, and a pressure sensor fixing member; and the driver is installed on the driver power fixing member and the driver fixing rotating shaft fixing member, the driver power fixing member and the driver fixing rotating shaft fixing member are worn on a back of metacarpal bone of a user through a strap, a driver pull rod is rotationally connected to a front end of the first rotating link through the driver pull rod fixing member, a rear end of the first rotating link is rotationally connected to a front end of the second rotating link, a rear end of the first linkage link is rotationally connected to the driver fixing rotating shaft fixing member, the rear end of the first linkage link is rotationally connected to a front end of the second linkage link, a rear end of the second linkage link is rotationally connected to a central rotating bearing hole of the second rotating link, a rear end of the second rotating link is rotationally connected to the finger sleeve, and the pressure sensor fixing member is connected to the finger sleeve through a strap and is fixed below a fingertip of an index finger; the driver drivers the first rotating link to couple with the first linkage link and the second linkage link through the second rotating link to drive the finger sleeve to bend and stretch, force feedback is applied to the fingertip of the index finger, and a pressure is accordingly imposed on a pressure sensor of the pressure sensor fixing member, such that a closed-loop force feedback control module is formed; and the apparatus is of simple structure, and can make the hand exoskeleton force feedback apparatus lightweight, reducing the discomfort of a user arising from wearing of the apparatus for a long period of time.

Further, the bearing includes two types of bearings, which are twelve rotating bearings and one sliding bearing, respectively;

the driver power fixing member and the driver fixing rotating shaft fixing member are fixed on a back of palm of the user through the strap, and fixed close to one side of an index finger, a base of the driver is fixed through the driver power fixing member and the driver fixing rotating shaft fixing member, the driver fixing rotating shaft fixing member is located at a proximal finger end of the metacarpal bone and is provided with a rotating bearing hole, and a first rotating bearing is placed in the rotating bearing hole;

the driver is a direct current wireless servo motor, and when being driven, the direct current wireless servo motor pulls the driver pull rod, and the driver pull rod is rigidly connected to the driver pull rod fixing member;

a rotating bearing hole is formed on the driver pull rod fixing member, and a second rotating bearing is placed in the rotating bearing hole;

rotating bearing holes are formed on the front and rear end of the first rotating link, and a third rotating bearing and a fourth rotating bearing are placed in the rotating bearing holes, respectively; and the front end of the first rotating link is rotationally connected to the second rotating bearing of the driver pull rod fixing member through the third rotating bearing and a sliding bearing, particularly, a sliding groove is formed at a central position of the first rotating link, and a sliding bearing is placed in the sliding groove;

rotating bearing holes are formed on the front and rear end of the second rotating link, and a fifth rotating bearing and a sixth rotating bearing are placed in the rotating bearing holes, respectively; and the front end of the second rotating link is rotationally connected to the fourth rotating bearing at the rear end of the first rotating link through the fifth rotating bearing, particularly, a rotating bearing hole is formed at a central position of the second rotating link, and a seventh rotating bearing is placed in the rotating bearing hole;

a rotating bearing hole is formed on the finger sleeve, and an eighth rotating bearing is placed in the rotating bearing hole; and the finger sleeve is rotationally connected to the sixth rotating bearing at the rear end of the second rotating link through the eighth rotating bearing, and particularly, the finger sleeve is fixedly connected to the index finger and the pressure sensor fixing member through a strap;

rotating bearing holes are formed on the front and rear ends of the first linkage link, and a ninth rotating bearing and a tenth rotating bearing are placed in the rotating bearing holes, respectively; and rotating bearing holes are formed on the front and rear ends of the second linkage link, and an eleventh rotating bearing and a twelfth rotating bearing are placed in the rotating bearing holes, respectively.

Further, the front end of the first linkage link is rotationally connected to the second rotating bearing of the driver pull rod fixing member through the ninth rotating bearing, the rear end of the first linkage link is rotationally connected to the sliding bearing and the second gasket through the tenth rotating bearing, and further, the gasket is rotationally connected to the front end of the second linkage link through the eleventh rotating bearing.

Further, the rear end of the second linkage link is rotationally connected to the seventh rotating bearing at the central position of the second rotating link through the twelfth rotating bearing.

Further, the pressure sensor fixing member is fixedly connected to the finger and the finger sleeve through a strap.

Further, the pressure sensor is tightly fixed to the pressure sensor fixing member, and the closed-loop force feedback control module is configured to set expected driving force.

Further, when the driver is driving, an expected force feedback value $F_c$ of a current control cycle is set, the driver pull rod drives the first rotating link to couple with the first linkage link and the second linkage link through the second rotating link to drive the finger sleeve to bend and stretch, force feedback is accordingly applied to a fingertip, at the same time, the pressure sensor of the pressure sensor fixing member collects an actual force feedback value $F_r$ once in the current control cycle, the actual force feedback value $F_r$ is compared with the expected force feedback value $F_c$, and a force feedback value increment of a direct current wireless servo motor is calculated and obtained according to a difference between the expected force feedback value $F_c$ and the actual force feedback value $F_r$, and the force feedback value increment $\Delta d$ is superimposed on the force feedback value increment of the direct current wireless servo motor in a previous control cycle, and is outputted as the force feedback value increment of the direct current wireless servo motor in a current control cycle, such that the closed-loop force feedback control module is formed.

Further, when the expected force feedback value $F_c$ is greater than the actual force feedback value $F_r$, the force feedback value increment $\Delta d$ of the direct current wireless servo motor is a positive figure; and when the expected force feedback value $F_c$ is smaller than the actual force feedback value $F_r$, the force feedback value increment $\Delta d$ of the direct current wireless servo motor is a negative figure.

The present disclosure has the beneficial effects:

(1) In lightweight hand exoskeleton force feedback apparatus according to the present disclosure, the first rotating link is coupled with the second rotating link through the first linkage link, the second linkage link and the sliding bearing, so that when the driver is driving, the rotating shafts of the first rotating link and the second rotating link can be changed simultaneously, and when the apparatus performs force feedback on the human's index finger, it conforms to the multi-axis rotation characteristic of skeleton rotation of the human's index finger, thereby avoiding damage to the human body and providing high-efficiency fingertip force feedback.

(2) In the present disclosure, the driver pull rod drives the first rotating link to couple with the first linkage link and the second linkage link through the second rotating link to drive the finger sleeve to bend and stretch, the control method is simple and effective, and can provide sufficient force feedback for the fingertip. Moreover, simple structure of the apparatus makes the wearing of the same lightweight, such that the weight of the apparatus is reduced, and the apparatus can be worn for a long period of time.

(3) In the present disclosure, the closed-loop force feedback control module monitors the actual force feedback value in real time through the pressure sensor and makes output adjustment, so that the force feedback value applied to the fingertip of index finger of the human body reaches the expected force feedback value, achieving accurate control. Furthermore, the lightweight hand exoskeleton force feedback apparatus has a certain degree of robustness to cope with interference caused by environmental changes, and to reduce possible damages the human body due to environmental interference.

DETAILED DESCRIPTIONS OF THE EMBODIMENTS

Figure 1:
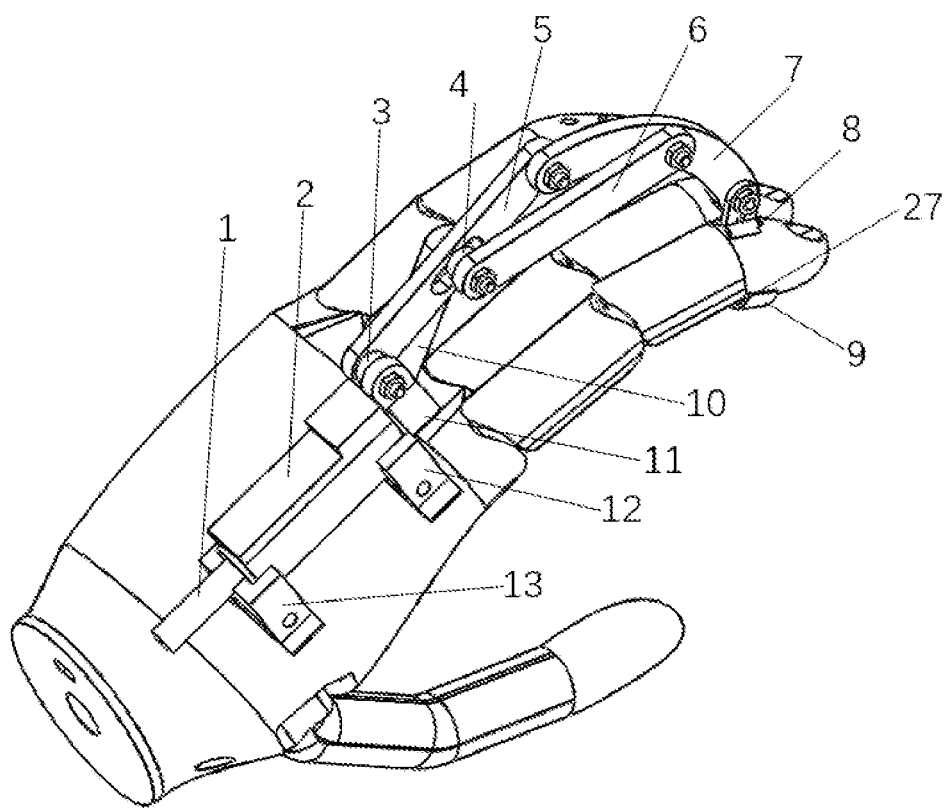
FIG. 1 is a schematic diagram of an overall structure of a lightweight hand exoskeleton force feedback apparatus according to the present disclosure in an extended state.

The present disclosure will be further illustrated below with reference to the accompanying drawings and specific embodiments by taking an index finger as an example. It should be understood that the following specific embodiments are only used to illustrate the present disclosure, but are not intended to limit the scope of the present disclosure.

As shown in FIGS. 1-8, a specific embodiment of the lightweight hand exoskeleton force feedback apparatus in the present disclosure includes: a driver pull rod 1, a driver 2, a first gasket 3, a second gasket 4, a first rotating link 5, a second linkage link 6, a second rotating link 7, a finger sleeve 8, a pressure sensor fixing member 9, a first linkage link 10, a driver pull rod fixing member 11, a driver fixing rotating shaft fixing member 12, a driver power fixing member 13, a first rotating bearing-a twelfth rotating bearing 14-25, a sliding bearing 26, a pressure sensor 27, and a closed-loop force feedback control module. Specifically, the second rotating link 7 is an arc-shaped rod, and the first rotating link 5, the second linkage link 6 and the first linkage link 10 are all straight rods.

Figure 2:
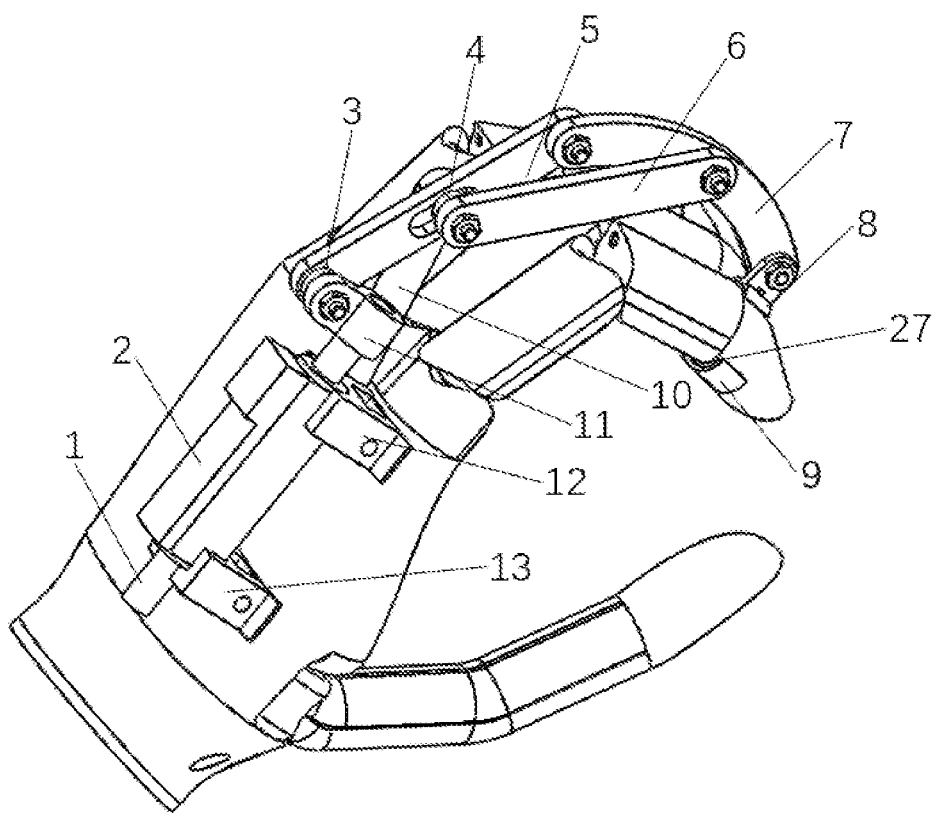
FIG. 2 is a schematic diagram of an overall structure of a lightweight hand exoskeleton force feedback apparatus according to the present disclosure in a bent state.
Figure 8:
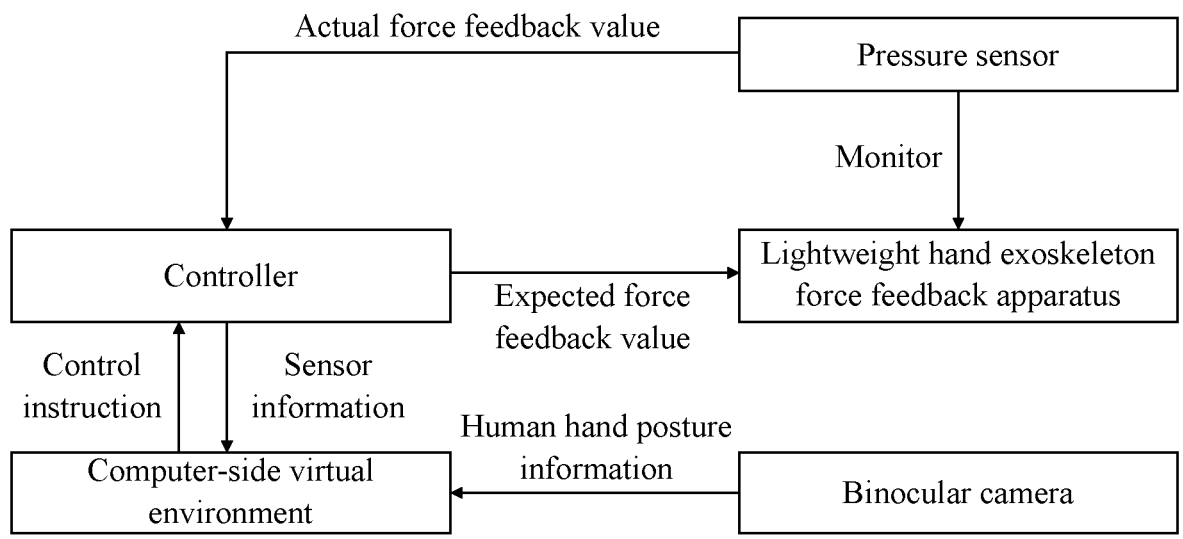
FIG. 8 is a schematic diagram of a closed-loop force feedback control module according to the present disclosure.

As shown in FIG. 1, a fingertip of index finger of a human hand wears the finger sleeve 8, and the finger sleeve 8 is fixedly connected to the pressure sensor fixing member 9 and the fingertip of index finger through a strap. The finger sleeve 8 is fixed above an index finger of the human hand through a strap, and the pressure sensor fixing member 9 is fixed below the index finger of the human hand through a strap, in such a way, when the human hand bends to simulate a state of grasping an object, the driver 2 pushes the driver pull rod 1 to drive the first rotating link 5 to couple with the first linkage link 10 and the second linkage link 6 through the second rotating link 7 to drive the finger sleeve 8 to bend and stretch, force feedback is accordingly applied to the fingertip, in which case, states of the human hand and the lightweight hand exoskeleton force feedback apparatus in the present disclosure is shown in FIG. 2. At the same time, the pressure sensor 27 of the pressure sensor fixing member 9 monitors an actual force feedback value, the actual force feedback value $F_r$, is compared with an expected force feedback value $F_c$, and a force feedback value increment of a direct current wireless servo motor is calculated and obtained according to a difference between the expected force feedback value $F_c$ and the actual force feedback value $F_r$, and the force feedback value increment $\Delta d$ is superimposed on the force feedback value increment of the direct current wireless servo motor in a previous control cycle, and is outputted as the force feedback value increment of the direct current wireless servo motor in a current control cycle, such that the closed-loop force feedback control module is formed, as shown in FIG. 8.

Figure 3:
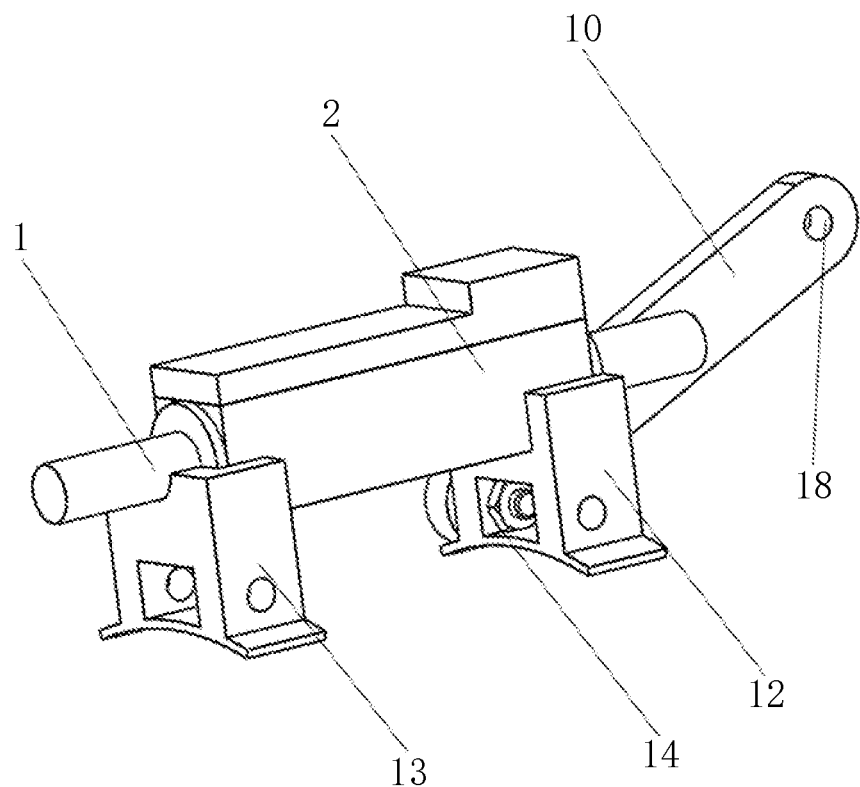
FIG. 3 is a schematic structural diagram of a driver fixing rotating shaft fixing member cooperating with a first linkage link according to the present disclosure.

As shown in FIGS. 1-3, the driver fixing rotating shaft fixing member 12 and the driver power fixing member 13 are fixed above a back of palm of an user through a strap, particularly, the driver power fixing member 13 is fixed close to a wrist, the driver fixing rotating shaft fixing member 12 is fixed to the index finger, both of them are fixed close to one side of the index finger, the driver 2 is fixed above the driver power fixing member and the driver fixing rotating shaft fixing member, and a driving direction of the driver 2 is a direction from the wrist to the index finger.

One side close to the back of palm of each of the driver fixing rotating shaft fixing member 12 and the driver power fixing member 13 is arc-shaped, as shown in FIG. 3, which conforms to a radian of the back of palm, such that the human hand can avoid possible damage when wearing the apparatus in the present disclosure.

Figure 5:
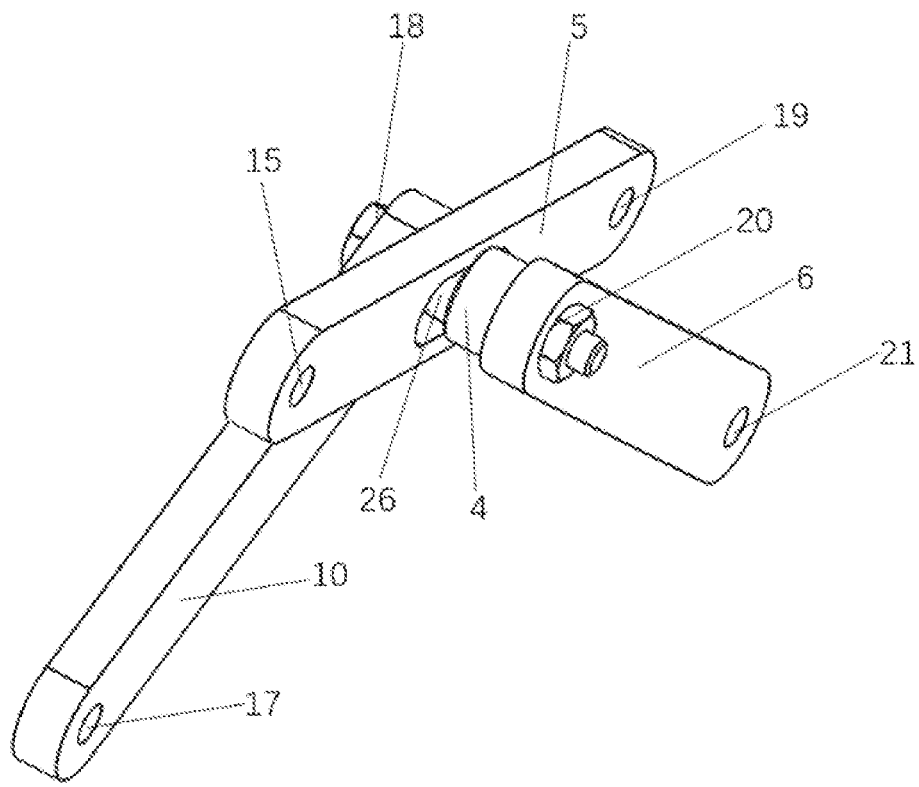
FIG. 5 is a schematic structural diagram of a first rotating link cooperating with a first linkage link and a second linkage link according to the present disclosure.

A rotating bearing hole is formed on a bottom of the driver fixing rotating shaft fixing member 12 close to a direction of a middle finger, and the first rotating bearing 14 is placed in the rotating bearing hole; and a rotating bearing hole is formed inside a front end of the first linkage link 10, and the ninth rotating bearing 17 is placed in the rotating bearing hole, as shown in FIG. 5. The first linkage link 10 is rotationally connected to a left side of the driver fixing rotating shaft fixing member 12 through the ninth rotating bearing 17 and the first rotating bearing 14.

In this embodiment, the driver 2 is provided with the driver pull rod 1 inside, and the driver pull rod 1 can move freely within a certain range, such that no resistance is generated to free grasping actions of the human hand. In this embodiment, when the human hand bends to simulate the state of grasping the object, the driver pull rod 1 is locked and cannot move freely, the closed-loop force feedback control module calculates the expected force feedback value required, converts the expected force feedback value into a driving force value, and outputs the driving force value to the driver 2, the driver 2 then pushes the driver pull rod 1 to drive the first rotating link 5 to couple with the first linkage link 10 and the second linkage link 6 through the second rotating link 7 to drive the finger sleeve 8 to bend and stretch, force feedback is accordingly applied to the fingertip, in which case, the states of the human hand and the lightweight hand exoskeleton force feedback apparatus in the present disclosure is shown in FIG. 2.

Figure 4:
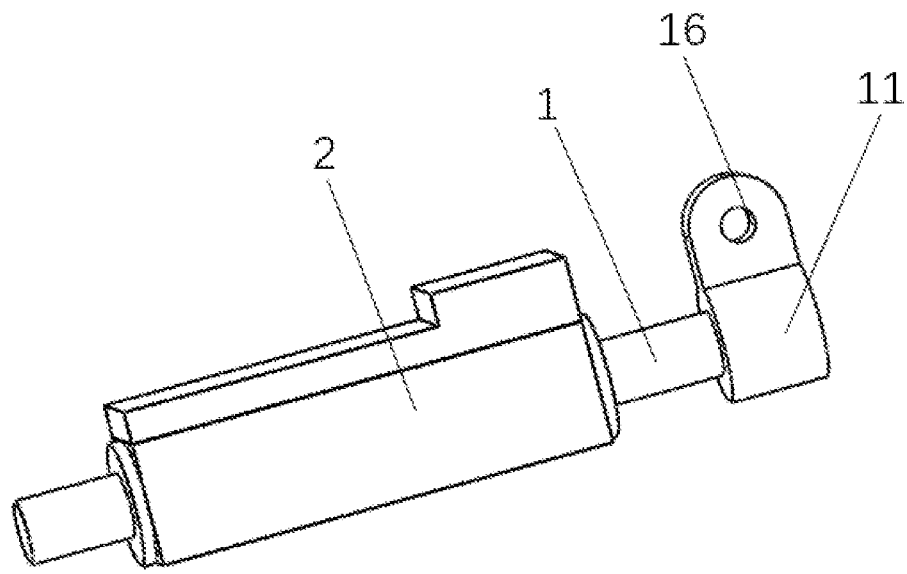
FIG. 4 is a schematic structural diagram of a driver pull rod fixing member cooperating with a first pull rod according to the present disclosure.

As shown in FIG. 4, the driver pull rod fixing member 11 is rigidly fixed at a top of the driver pull rod 1 close to the index finger and is locked, and the driver pull rod fixing member 11 is aligned with, and does not move relative to a right side of the driver pull rod 1. A rotating bearing hole is formed on a top of the driver pull rod fixing member 11, and the second rotating bearing 16 is placed in the rotating bearing hole. A rotating bearing hole is formed on a front end of the first rotating link 5, and the third rotating bearing 15 is placed in the rotating bearing hole; and a rotating bearing hole is formed on a rear end of the first rotating link, and the fourth rotating bearing 19 is placed in the rotating bearing hole.

With reference to FIG. 1, a left side of the driver pull rod fixing member 11 is rotationally connected to a front end of the first rotating link 5 through the first gasket 3, the second rotating bearing 16 and the third rotating bearing 15, and the first gasket 3 is located between the driver pull rod fixing member 11 and the first rotating link 5 to avoid deflection when the driver pull rod fixing member 11 and the first rotating link 5 are rotating.

In a specific embodiment of the present disclosure, as shown in FIG. 5, a sliding groove is formed at a central position of the first rotating link 5, and the sliding bearing 26 is placed in the sliding groove and can slide freely; rotating bearing holes are formed on a front end and a rear end of the second linkage link 6, respectively, and the eleventh rotating bearing 20 and the twelfth rotating bearing 21 are placed in the rotating bearing holes, respectively; a rotating bearing hole is formed on a rear end of the first linkage link 10, the tenth rotating bearing 18 is placed in the rotating bearing hole, the second gasket 4, the first rotating link 5 and the first linkage link 10 are sequentially placed on a left side of the front end of the second linkage link 6, and these components are rotationally connected through the eleventh rotating bearing 20, the second gasket 4, the sliding bearing 26 and the tenth rotating bearing 18. Through the slidable sliding bearing 26, rotating shafts of the first rotating link 5 and the second rotating link 7 can be changed along with movements of the human hand, such that an objective of conforming to the multi-axis rotation characteristic of skeleton rotation of the human's index finger is achieved when the lightweight hand exoskeleton force feedback apparatus in the present disclosure performs force feedback on the human's index finger. The first gasket 3 is located between the second linkage link 6 and the sliding bearing 26 to avoid deflection when the second linkage link 6 and the sliding bearing 26 are rotating.

Figure 6:
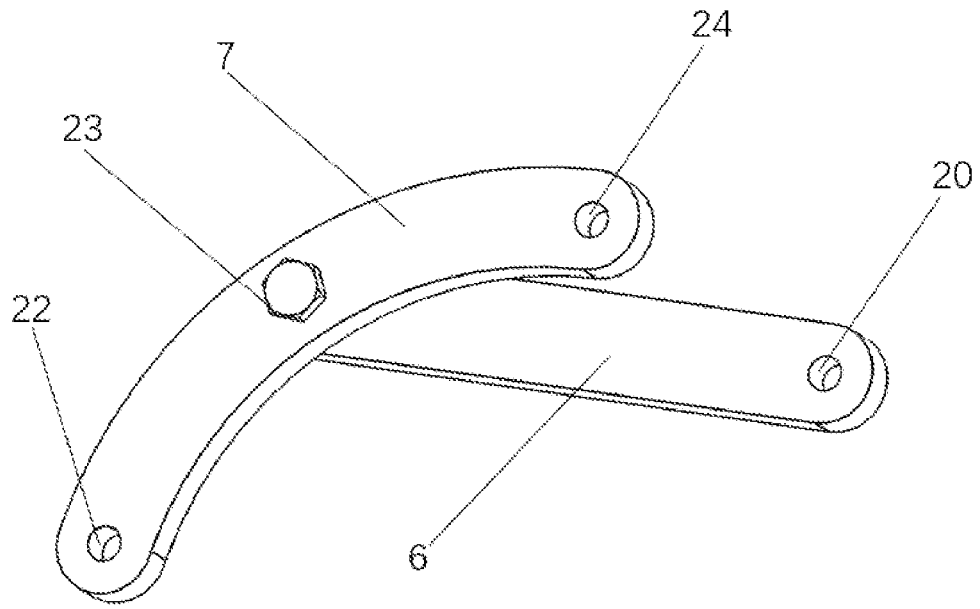
FIG. 6 is a schematic structural diagram of a second rotating link cooperating with a second linkage link according to the present disclosure.

As shown in FIG. 6, a rotating bearing hole is formed on a front end of the second rotating link 7, and the fifth rotating bearing 24 is placed in the rotating bearing hole; a rotating bearing hole is formed on a rear end of the second rotating link, and the sixth rotating bearing 22 is placed in the rotating bearing hole; a rotating bearing hole is formed at a central position of the second rotating link 7, the seventh rotating bearing 23 is placed in the rotating bearing hole, the central position of the second rotating link 7 is rotationally connected to the second linkage link 6 through the twelfth rotating bearing 21 and the seventh rotating bearing 23, and the second rotating link 7 is located on a left side of the second linkage link 6.

Further, the front end of the second rotating link 7 is rotationally connected to a rear end of the first rotating link 5 through the fourth rotating bearing 19 and the fifth rotating bearing 24, as shown in FIG. 1, and the second rotating link 7 is located on a right side of the first rotating link 5.

Figure 7:
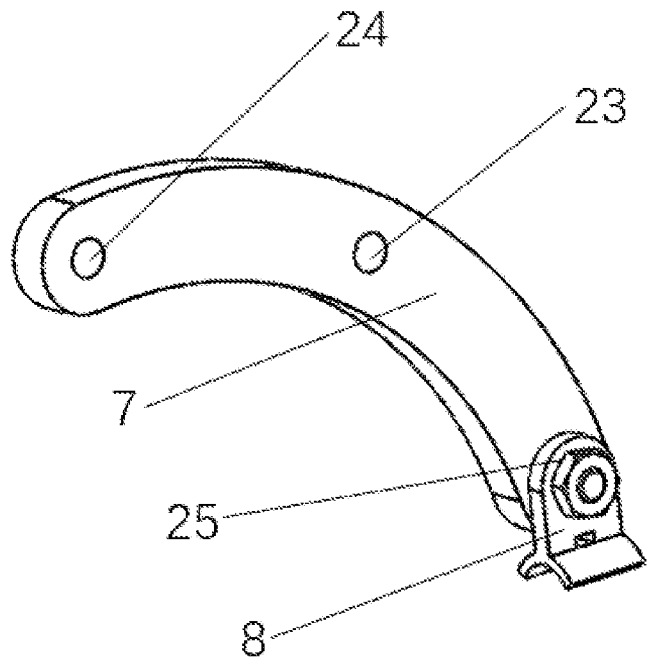
FIG. 7 is a schematic structural diagram of a second rotating link cooperating with a finger sleeve according to the present disclosure.

With reference to FIGS. 1-7, a rotating bearing hole is formed on a top of the finger sleeve 8, the eighth rotating bearing 25 is placed in the rotating bearing hole, the top of the finger sleeve 8 is rotationally connected to the rear end of the second rotating link 7 through the eighth rotating bearing 25 and the sixth rotating bearing 22, and the second rotating link 7 is located on a left side of the finger sleeve 8. As shown in FIG. 7, a side of the finger sleeve 8 close to the index finger is arc-shaped, which conforms to a radian of a back of the index finger of the human hand, such that the human hand can avoid possible damage when wearing the apparatus in the present disclosure, and the comfort of the wearer is improved. The side of the finger sleeve 8 close to the index finger is fixedly connected to the pressure sensor fixing member 9 and the fingertip of index finger through a strap. The finger sleeve 8 is fixed above the index finger of the human hand through a strap, and the pressure sensor fixing member 9 is fixed below the index finger of the human hand through a strap, as shown in FIG. 1.

Specifically, the strap stated in the present disclosure is a hook-and-loop fastener for fixing the driver fixing rotating shaft fixing member 12 and the driver power fixing member 13 above the back of palm of the user, and for fixing the finger sleeve 8 and the pressure sensor fixing member 9 on the fingertip of index finger, as shown in FIG. 1.

It is worth noting that a side of the pressure sensor fixing member 9 close to the index finger is arc-shaped, as shown in FIG. 1, which conforms to a radian of a pulp of index finger of the human hand. The pressure sensor 27 is located between the pressure sensor fixing member 9 and the pulp of index finger of the human hand, and is fixed to a side of the pressure sensor fixing member 9 close to the index finger of the human hand.

The movement process of force feedback movement on the index finger by the lightweight hand exoskeleton force feedback apparatus in the embodiment of the present disclosure: the driver 2 pulls the driver pull rod 1 to move towards the wrist, such that the driver pull rod 1 drives the first rotating link 5 to couple with the first linkage link 10 and the second linkage link 6 via the second rotating link 7, and the finger sleeve 8 is driven to move towards the pulp of index finger to a direction of the back of index finger, thereby implementing a force feedback action on the index finger.

In one specific embodiment of the present disclosure, as shown in FIG. 8, the closed-loop force feedback control module of the present disclosure includes a pressure sensor 27, a lightweight hand exoskeleton force feedback apparatus, a controller, a computer-side virtual environment, and a binocular camera. The computer-side virtual environment communicates with the controller through an UART, and the sensor 27 is arranged below the pulp of index finger and transmits the measured actual force feedback value $F_r$ to the controller; the computer-side virtual environment can send a control instruction to the controller, and the controller can send information of the sensor obtained thereby to the computer-side virtual environment; and the binocular camera can send human hand posture information detected thereby to the computer-side virtual environment as a basis for determining whether the apparatus needs to implement the force feedback action.

Further, when the computer-side virtual environment determines that a simulated hand in a virtual environment grasps a virtual object according to the human hand posture information, the expected force feedback value $F_c$ required is calculated, and the instruction is transmitted to the controller through the UART, such that the controller sets the expected force feedback value $F_c$ in the current control cycle, at the same time, the pressure sensor 27 of the pressure sensor fixing member collects the actual force feedback value $F_r$ once in the current control cycle, the actual force feedback value $F_r$, is compared with the expected force feedback value $F_c$, and the force feedback value increment of the direct current wireless servo motor is calculated and obtained according to a difference between the expected force feedback value $F_c$ and the actual force feedback value $F_r$, and the force feedback value increment $\Delta d$ is superimposed on the force feedback value increment of the direct current wireless servo motor in a previous control cycle, and is outputted as the force feedback value increment of the direct current wireless servo motor in the current control cycle, such that the closed-loop force feedback control module is formed.

Further, when the expected force feedback value $F_c$ is greater than the actual force feedback value $F_r$, the force feedback value increment $\Delta d$ of the direct current wireless servo motor is a positive figure; and when the expected force feedback value $F_c$ is smaller than the actual force feedback value $F_r$, the force feedback value increment $\Delta d$ of the direct current wireless servo motor is a negative figure.

It should be noted that the above content merely illustrates the technical idea of the present disclosure and cannot limit the protection scope of the present disclosure, those ordinarily skilled in the art may also make some modifications and improvements without departing from the principle of the present disclosure, and these modifications and improvements should also fall within the protection scope of the claims of the present disclosure.

What is claimed is:

1. A lightweight hand exoskeleton force feedback apparatus, comprising a driver, a driver power fixing member, a driver fixing rotating shaft fixing member, a driver pull rod fixing member, a first rotating link, a second rotating link, a first linkage link, a second linkage link, bearings, gaskets, a finger sleeve, and a pressure sensor fixing member; wherein
   the driver is installed on the driver power fixing member and the driver fixing rotating shaft fixing member, the driver power fixing member and the driver fixing rotating shaft fixing member are worn on a back of a metacarpal bone of a user through a first strap, a driver pull rod is rotationally connected to a front end of the first rotating link through the driver pull rod fixing member, a rear end of the first rotating link is rotationally connected to a front end of the second rotating link, a rear end of the first linkage link is rotationally connected to the driver fixing rotating shaft fixing member, the rear end of the first linkage link is rotationally connected to a front end of the second linkage link, a rear end of the second linkage link is rotationally connected to a central rotating bearing hole of the second rotating link, a rear end of the second rotating link is rotationally connected to the finger sleeve, and the pressure sensor fixing member is connected to the finger sleeve through a second strap and is fixed below a fingertip of an index finger; the driver drives the first rotating link to couple with the first linkage link and the second linkage link through the second rotating link to drive the finger sleeve to bend and stretch, a force feedback is applied to the fingertip, and a pressure is accordingly imposed on a pressure sensor of the pressure sensor fixing member, such that a closed-loop force feedback control module is formed.

2. The lightweight hand exoskeleton force feedback apparatus according to claim 1, wherein the bearing comprises two types of bearings, which are twelve rotating bearings and one sliding bearing, respectively;

the driver power fixing member and the driver fixing rotating shaft fixing member are fixed on a back of a palm of the user through the first strap, and fixed close to one side of the index finger, a base of the driver is fixed through the driver power fixing member and the driver fixing rotating shaft fixing member, the driver fixing rotating shaft fixing member is located at a proximal finger end of the metacarpal bone and is provided with a first rotating bearing hole, and a first rotating bearing is placed in the first rotating bearing hole;

the driver is a direct current wireless servo motor, and when being driven, the direct current wireless servo motor pulls the driver pull rod, and the driver pull rod is rigidly connected to the driver pull rod fixing member;

a second rotating bearing hole is formed on the driver pull rod fixing member, and a second rotating bearing is placed in the second rotating bearing hole;

a first group of rotating bearing holes are formed on the front end of the first rotating link and the rear end of the first rotating link, and a third rotating bearing and a fourth rotating bearing are placed in the first group of rotating bearing holes, respectively; and the front end of the first rotating link is rotationally connected to the second rotating bearing of the driver pull rod fixing member through the third rotating bearing and the sliding bearing, particularly, a sliding groove is formed at a central position of the first rotating link, and the sliding bearing is placed in the sliding groove;

a second group of rotating bearing holes are formed on the front end of the second rotating link and the rear end of the second rotating link, and a fifth rotating bearing and a sixth rotating bearing are placed in the second group of rotating bearing holes, respectively; and the front end of the second rotating link is rotationally connected to the fourth rotating bearing at the rear end of the first rotating link through the fifth rotating bearing, particularly, a third rotating bearing hole is formed at a central position of the second rotating link, and a seventh rotating bearing is placed in the third rotating bearing hole;

a fourth rotating bearing hole is formed on the finger sleeve, and an eighth rotating bearing is placed in the fourth rotating bearing hole; and the finger sleeve is rotationally connected to the sixth rotating bearing at the rear end of the second rotating link through the eighth rotating bearing, and particularly, the finger sleeve is fixedly connected to the index finger and the pressure sensor fixing member through the second strap;

a third group of rotating bearing holes are formed on a front end of the first linkage link and the rear end of the first linkage link, and a ninth rotating bearing and a tenth rotating bearing are placed in the third group of rotating bearing holes, respectively; and a fourth group of rotating bearing holes are formed on the front end of the second linkage link and the rear end of the second linkage link, and an eleventh rotating bearing and a twelfth rotating bearing are placed in the fourth group of rotating bearing holes, respectively.

3. The lightweight hand exoskeleton force feedback apparatus according to claim 1, wherein a front end of the first linkage link is rotationally connected to a second rotating bearing of the driver pull rod fixing member through the ninth rotating bearing, the rear end of the first linkage link is rotationally connected to a sliding bearing and a second gasket through a tenth rotating bearing, and further, a first gasket is rotationally connected to the front end of the second linkage link through an eleventh rotating bearing.

4. The lightweight hand exoskeleton force feedback apparatus according to claim 1, wherein the rear end of the second linkage link is rotationally connected to a seventh rotating bearing at a central position of the second rotating link through a twelfth rotating bearing.

5. The lightweight hand exoskeleton force feedback apparatus according to claim 1, wherein the pressure sensor fixing member is fixedly connected to the finger and the finger sleeve through the second strap.

6. The lightweight hand exoskeleton force feedback apparatus according to claim 1, wherein the pressure sensor is tightly fixed to the pressure sensor fixing member, and the closed-loop force feedback control module is configured to set an expected driving force.

7. The lightweight hand exoskeleton force feedback apparatus according to claim 1, wherein when the driver is driving, an expected force feedback value Fe of a current control cycle is set, the driver pull rod drives the first rotating link to couple with the first linkage link and the second linkage link through the second rotating link to drive the finger sleeve to bend and stretch, the force feedback is accordingly applied to the fingertip, at the same time, the pressure sensor of the pressure sensor fixing member collects an actual force feedback value $F_r$ once in the current control cycle, the actual force feedback value $F_r$ is compared with the expected force feedback value $F_c$, and a force feedback value increment of a direct current wireless servo motor is calculated and obtained according to a difference between the expected force feedback value $F_c$ and the actual force feedback value $F_r$, and the force feedback value increment $\Delta d$ is superimposed on the force feedback value increment of the direct current wireless servo motor in a previous control cycle, and is outputted as the force feedback value increment of the direct current wireless servo motor in the current control cycle, such that the closed-loop force feedback control module is formed.

8. The lightweight hand exoskeleton force feedback apparatus according to claim 7, wherein when the expected force feedback value $F_c$ is greater than the actual force feedback value $F_r$, the force feedback value increment $\Delta d$ of the direct current wireless servo motor is a positive figure; and when the expected force feedback value $F_c$ is smaller than the actual force feedback value $F_r$, the force feedback value increment $\Delta d$ of the direct current wireless servo motor is a negative figure.

* * * * *